US012639474B2

(12) United States Patent
    Krafcik et al.

(10) Patent No.: US 12,639,474 B2
(45) Date of Patent: May 26, 2026

(54) RESTRICTED ENVIRONMENTS FOR MESSAGE GENERATION IN NETWORKED ENVIRONMENTS

(71) Applicant: Google LLC, Mountain View, CA (US)

(72) Inventors: Jonathan Krafcik, Mercer Island, WA (US); Yian Gao, Mountain View, CA (US); Gang Wang, Jersey Citoy, NJ (US)

(73) Assignee: Google LLC, Mountain View, CA (US)

( * ) Notice: Subject to any disclaimer, the term of this patent is extended or adjusted under 35 U.S.C. 154(b) by 786 days.

(21) Appl. No.: 17/042,785

(22) PCT Filed: Apr. 16, 2019

(86) PCT No.: PCT/US2019/027736
     § 371 (c)(1),
     (2) Date: Sep. 28, 2020

(87) PCT Pub. No.: WO2020/214156
     PCT Pub. Date: Oct. 22, 2020

(65) Prior Publication Data
     US 2021/0240854 A1     Aug. 5, 2021

(51) Int. Cl.
     *G06F 21/62*      (2013.01)
     *H04L 67/02*      (2022.01)
     *H04L 67/146*     (2022.01)
     *H04L 67/561*     (2022.01)

(52) U.S. Cl.
     CPC ...... *G06F 21/6263* (2013.01); *G06F 21/6227* (2013.01); *H04L 67/02* (2013.01); *H04L 67/146* (2013.01); *H04L 67/561* (2022.05)

(58) Field of Classification Search
     CPC . G06F 21/6263; G06F 21/6227; H04L 67/02; H04L 67/146; H04L 67/2804; G06Q 30/0251; G06Q 30/0277
     USPC .............................................. 726/30; 709/203
     See application file for complete search history.

(56) References Cited

U.S. PATENT DOCUMENTS

| | | | |
|---|---|---|---|
| 2004/0205650 A1* | 10/2004 | Cheng ................. G06F 16/9577 |
| | | | 715/239 |
| 2015/0156203 A1 | 6/2015 | Giura et al. | |
| 2017/0032147 A1* | 2/2017 | Denner ............... H04L 63/0281 |

(Continued)

FOREIGN PATENT DOCUMENTS

| | | | |
|---|---|---|---|
| EP | 1 233 333 | 8/2002 | |
| EP | 1233333 A1 * | 8/2002 | ......... G06F 21/6263 |

OTHER PUBLICATIONS

International Search Report and Written Opinion for PCT Appln. Ser. No. PCT/US2019/027736 dated Jan. 16, 2020 (15 pages).

(Continued)

*Primary Examiner* — Joon H Hwang
*Assistant Examiner* — Sherman Lin
(74) *Attorney, Agent, or Firm* — Fish & Richardson P.C.

(57) ABSTRACT

Systems and methods described herein can provide a restricted environment for the local execution of server provided processor-executable instructions. The restricted environment can be maintained by a web browser to enable sandboxed generation of content requests by the web browser during the rendering of web pages. The restricted environment can enable the web browser to control the generation and transmission of content requests.

22 Claims, 5 Drawing Sheets

(56) References Cited

U.S. PATENT DOCUMENTS

2017/0180413 A1    6/2017  Petry et al.
2018/0218145 A1    8/2018  Hussain et al.

OTHER PUBLICATIONS

Office Action in Indian Appln. No. 202027041246, dated Aug. 25, 2022, 6 pages (with English translation).
Office Action in Chinese Appln. No. 201980026394.9, dated Jan. 13, 2023, 19 pages (with English translation).
Ahmed et al., "QoS-aware device selection using user preferences for tasks in ubiquitous environments." 2011 7th International Conference on Emerging Technologies. IEEE, Sep. 2011, 6 pages.
Jia, "Web log mining technology Applied research" Journal of Chongqing Normal University, Natural Sciences Edition, Issue 04, vol. 23, Dec. 2006, 39-44 (with English abstract).
Notice of Allowance in Chinese Appln. No. 201980026394.9, mailed on Jun. 19, 2023, 6 pages (with English translation).

* cited by examiner

RESTRICTED ENVIRONMENTS FOR MESSAGE GENERATION IN NETWORKED ENVIRONMENTS

BACKGROUND OF THE DISCLOSURE

When a client device visits a website, the website can transmit small packets of data to the client device. The small packets of data can include preferences, session information, or be used to authenticate and maintain a session between the client device and the device hosting the website. The data stored by the website can be stored indefinitely or can be purged at regular intervals. Web browsers can prevent domains from accessing the data of other domains or from storing data on the client device when the client device is not in an active session with the domain. Preventing the web browsers from storing and accessing data can prevent content rendered by the web browser from selecting customized content for the insertion into the content.

SUMMARY OF THE DISCLOSURE

The system and methods described herein can allow delivery of customized content without compromising the privacy of a user by controlling content requests generated by the web browser. The system can include a secure vault or restricted environment where the browser executes the processor-executable instructions for the generation of content items to fill content slots. The system can control the inputs that the restricted environment receives (e.g., which device capabilities or identifiers the restricted environment can receive). In some implementations, the restricted environment can also control allowed destinations of the content requests. For example, the restricted environment can enable the content slots to generate requests that can only be transmitted to a proxy, which obfuscates the web browser and client device from the content server. The proxy can mask the web browser's internet protocol (IP) address from the content server. The proxy can also enforce aggregation requirements to further obfuscate the web browser from the content server. For example, the request to the proxy can include parameters lists for requesting the customized content. The proxy can enforce the aggregation requirements by not allowing requests to be fulfilled until the given parameter list has been requested a predetermined number of times. This can ensure that parameters that are highly specific to a web browser or client device (and thus may enable identification by a third party) cannot be used for the retrieval or selection of content items.

According to at least one aspect of the disclosure, a method to exchange data in a networked system can include storing, by a web browser executed by a client device, a client device profile that can include a plurality of client device parameters and processor-executable instructions to generate a content request in a restricted environment of the client device. The restricted environment can be associated with a content server. The method can include transmitting, by the web browser, a content item parameter to the restricted environment based on the web browser receiving a web page. The method can include generating, by the web browser executing the processor-executable instructions stored in the restricted environment, a parameter list based on the client device profile and the content item parameter. The method can include transmitting, by the web browser, the parameter list to a proxy server. The method can include receiving, by the web browser, a content item to render in a content slot of the web page based on the proxy server determining an aggregate value of at least one parameter in the parameter list that satisfies a predetermined threshold.

According to at least one aspect of the disclosure, a system to exchange data in a networked system can include a web browser executed by one or more processors of a client device. The web browser can maintain one or more restricted environments. The web browser can store, in a restricted environment, a client device profile that can include a plurality of client device parameters and processor-executable instructions to generate a content request. The restricted environment can be associated with a content server. The web browser can transmit a content item parameter to the restricted environment based on the web browser receiving a web page. The web browser can generate, based on execution of the processor-executable instructions stored in the restricted environment, a parameter list based on the client device profile and the content item parameter. The web browser can transmit the parameter list to a proxy server. The web browser can receive a content item to render in a content slot of the web page based on the proxy server determining an aggregate value of at least one parameter in the parameter list that satisfies a predetermined threshold.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Content, such as web pages, can include content slots that include processor-executable instructions that, when executed by a web browser, can cause the web browser to request customized content to render into the content slots. The content can be customized based on, for example, device capabilities (e.g., screen resolution or orientation, color depth, bandwidth, etc.) or any other such information. The system and methods described herein can allow customized content to be provided without compromising the privacy of a user by controlling content requests generated by the web browser. The system can include a secure vault or restricted environment where the browser executes the processor-executable instructions for the generation of content items to fill content slots. The system can control the inputs that the restricted environment receives (e.g., which device capabilities or identifiers the restricted environment can receive). In some implementations, the restricted environment can also control allowed destinations of the content requests. For example, the restricted environment can enable the content slots to generate requests that can only be transmitted to a proxy, which obfuscates the web browser and client device from the content server. The proxy can mask the web browser's internet protocol (IP) address from the content server. The proxy can also enforce aggregation requirements to further obfuscate the web browser from the content server. For example, the request to the proxy can include parameters lists for requesting the customized content. The proxy can enforce the aggregation requirements by not allowing requests to be fulfilled until the given parameter list has been requested a predetermined number of times. This can ensure that parameters that are highly specific to a web browsers or client device (and thus may enable identification by a third party) cannot be used for the retrieval or selection of content items.

Figure 1:
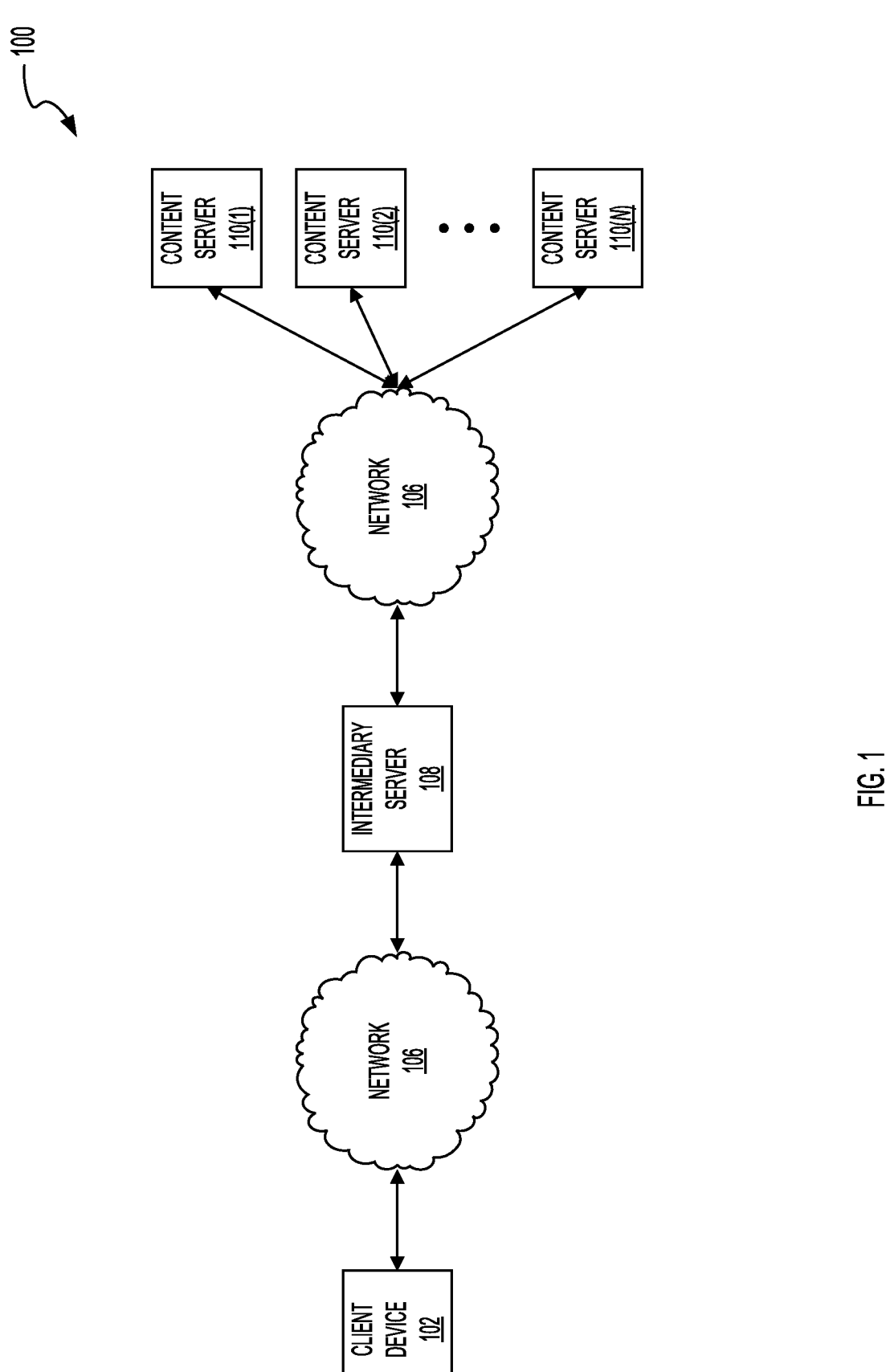
FIG. 1 illustrates a block diagram of an example network and device environment for data exchange, according to some implementations.

FIG. 1 illustrates a block diagram of an example network and device environment 100 for data exchange. As illustrated, one or more client devices 102 can communicate via networks 106 with one or more content servers 110(1)-110 (N), which can be generally referred to as content servers 110. The client device 102 can communicate with the content servers 110 via one or more intermediary servers 108. The client device 102 can include any type and form of computing device, including a desktop computer, laptop computer, portable computer, tablet computer, wearable computer, embedded computer, smart television, console, Internet of Things (IoT) device or smart appliance, or any other type and form of computing device. The client device 102 can request content from the content servers 110. For example, the content servers 110 can provide content that the client device 102 renders into one or more content slots of applications or web pages. The content slots can include JavaScript or other processor-executable instructions that can cause the client device 102 to request content from the content servers 110 (via the intermediary server 108) to fill the content slots. The processor-executable instructions can be provided by the content servers 110.

The system 100 can include one or more networks 106. The networks 106 can include type and form of network, including local area networks (LANs), wide area networks (WANs) such as the Internet, satellite networks, cable networks, broadband networks, fiber optic networks, microwave networks, cellular networks, wireless networks, or any combination of these or other such networks. The system 100 can include networks 106 of the same or different types. For example, the network 106 between the client device 102 and the intermediary server 108 can be of a first type and the network 106 between the intermediary server 108 and the content servers 110 can be of a second type. The network 106 between the client device 102 and the intermediary server 108 and the network 106 between the intermediary server 108 and the content servers 110 can be the same network or components of the same network.

The networks 106 can include a plurality of additional devices, including, for example, gateways, modems, firewalls, routers, switches, etc. The networks 106 can include any number of computing devices (e.g., computer, servers, routers, network switches, etc.) that are configured to receive and/or transmit data within networks 106. The networks 106 can include any number of hardwired and/or wireless connections. A client device 102 can communicate wirelessly (e.g., via WiFi, cellular, radio, etc.) with a transceiver that is hardwired (e.g., via a fiber optic cable, a CAT5 cable, etc.) to other computing devices within the networks 106. The networks 106 can include or can be virtual networks, such as a virtual network between a plurality of virtual machines executed by a single physical machine, or an abstract network such as an offline transfer of data via physically movable media (e.g., a Sneakernet, transferring data via tape media, CD-ROM, flash media, external hard drives, floppy disks, etc.).

The system 100 can include one or more intermediary servers 108. The intermediary servers 108 can be a proxy between the client devices 102 and the content servers 110. The client device 102 can transmit requests to the intermediary server 108, which the intermediary server 108 can forward to a content server 110 for fulfillment. The requests can include a header that indicates a forwarding destination or final destination of the request. The intermediary server 108 can prevent the content servers 110 from receiving one or more identifiers (e.g., IP addresses) from the client device 102. The intermediary server 108 can apply one or more forwarding policies to the received requests before determining to forward the request to one or more of the content servers 110. For example, one of the forwarding policies can be an aggregation policy that sets a threshold for the number of similar requests the intermediary server 108 must receive within a given time period before the intermediary server 108 forwards the requests to one or more content servers 110. The forwarding policies can include an aggregation policy that domain- or content server-specific. For example, the aggregation policy can hold the requests until or unless a predetermined number of requests are received for a specific domain (e.g., www.example.com). The forwarding policies can include aggregations policies or thresholds for a plurality of aggregation domains. A multi-dimensional policy can set a threshold for a domain (e.g., www.example-.com) and a predetermined content server.

In some implementations, the request does not indicate a target content server 110 and the intermediary server 108 can select which of the content servers 110 to send the request to. The selection can be via a load balancing algorithms, auction algorithms (e.g., with the content servers 110 bidding for opportunities to provide content), etc. The intermediary server 108 can thus be referred to as an exchange server, a load balancer, or by any other such term. In some implementations, the intermediary server 108 can forward the request to a separate exchange server or load balancer that can select a content server 110 from a pool of content servers 110.

The intermediary server 108 can manage return responses from the content servers 110 to the client devices 102. For example, in response to a request forwarded to a content server 110 from the intermediary server 108, the content server 110 can select a content item. The content server 110 can transmit the content item to the intermediary server 108, which can forward the content item to the client device 102 that generated the original request for the content.

The system 100 can include one or more content servers 110. The content servers 110 can include content repositories. The content servers 110 can select content from the content repositories in response to receiving a content request from the intermediary server 108 or the client device 102. In some implementations, the content request from the client device 102 can include an identifier, such as a cookie, provided to the client device 102 by the content server 110 in an earlier data exchange or a parameter list. The content server 110 can select content from the content repository based on the identifier. For example, the content server 110 can associate the identifier with such as, but not limited to, preferences and computational resources of the client device 102 (e.g., screen size and resolution), among others. The content server 110 can select the content from the data repository based on the data associated with the identifier. The content server 110 can select the content item based on a parameter list included in the request. The parameter list can include parameters (e.g., screen size, resolution, content slot size, subject matter) that the content server 110 can use in selecting the content item.

The client devices 102, intermediary servers 108, and the content servers 110 can include any type and form of computing device, including desktop computers, servers, workstations, laptop computers, portable computers, embedded computers, or any other type and form of computing device. The intermediary servers 108 and the content servers 110 can include virtual machines executed by one or more physical computing devices, and can be configured as a server farm, cluster, or cloud of devices.

Figure 2:
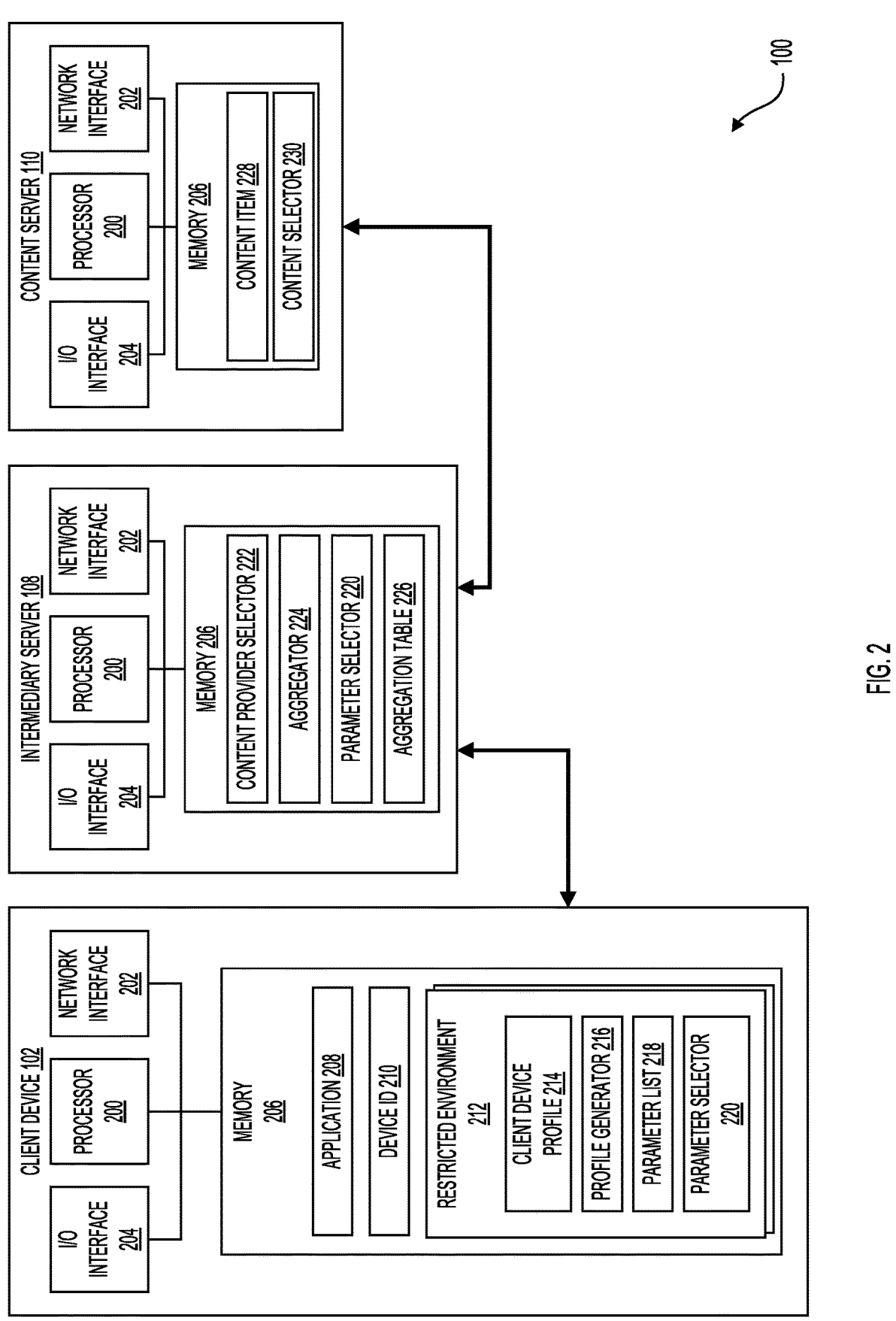
FIG. 2 illustrates a block diagram of example computing devices for use in the example network and device environment illustrated in FIG. 1, according to some implementations.

FIG. 2 illustrates a block diagram of example computing devices for use in the example network and device environment illustrated in FIG. 1. The example network and device environment can include one or more client devices 102 that can communicate with one or more content servers 110 via one or more intermediary servers 108.

As discussed above, the client device 102 can be referred to as a client, device, client device, computing device, user device, or any other such term. The client device 102 can include or be a component of a desktop computer, laptop computer, tablet computer, smartphone, video game console, smart television or set top box, server, workstation, or any other type and form of computing device capable of communicating over a network 106. In some implementations, a client device 102 can execute an application 208 for communicating over the network 106. The application 208 can be a service, server, daemon, routine, or other executable logic for communicating over a network 106. The application 208 can be a web browser, mail client, video player, music player, video game, or any other such application. Such applications can include a command line interface, graphical user interface, or any combination of these or other interfaces.

The client device 102 can include one or more processors 200, network interfaces 202, and I/O interfaces 204. The client device 102 can include memory 206. The memory 206 can store machine instructions that, when executed by processor 200, cause the processor 200 to perform one or more of the operations described herein. The processor 200 can include a microprocessor, ASIC, FPGA, etc., or combinations thereof. The processor 200 can be a multi-core processor or an array of processors. The memory 206 can include, but is not limited to, electronic, optical, magnetic, or any other storage devices capable of providing processor 200 with program instructions. The memory 206 can include a floppy disk, CD-ROM, DVD, magnetic disk, memory chip, ROM, RAM, EEPROM, EPROM, flash memory, optical media, or any other suitable memory from which processor 200 can read instructions. The instructions can include code from any suitable computer programming language such as, but not limited to, C, C++, C#, Java, JavaScript, Perl, HTML, XML, Python and Visual Basic.

The client device 102 can include one or more network interfaces 202. The network interface 202 can include any type and form of interface, including Ethernet including 10 Base T, 100 Base T, or 1000 Base T; any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 106. The client device 102 can include a plurality of network interfaces 202 of different types, allowing for connections to a variety of networks 106 or a network 106 such as the Internet via different sub-networks.

The client device 102 can include one or more I/O interfaces 204. The I/O interface 204 can be hardware-based or software-based. The I/O interfaces 204 can be any electronic device that conveys data to a user by generating sensory information (e.g., a visualization on a display, one or more sounds, tactile feedback, etc.) and/or converts received sensory information from a user into electronic signals (e.g., a keyboard, mouse, pointing device, touch screen display, microphone, etc.). The one or more user interface devices can be internal to the housing of the client device 102, such as a built-in display, touch screen, microphone, etc., or external to the housing of the client device 102, such as a monitor connected to the client device 102, a speaker connected to the client device 102, etc., according to various implementations.

The client device 102 can store data and processor-executable instructions in the memory 206. For example, the client device 102 can store the application 208 as processor-executable instructions in the memory 206. The application 208 can be an application, applet, script, service, daemon, routine, or other executable logic for receiving content and displaying or otherwise outputting content via an I/O interface 204 of the client device (e.g., display, speaker, etc.). For example, the application 208 can be a web browser that receives and renders web pages or other content. The application 208 can include functionality for displaying content received via network interface 202 and/or generated locally by processor 200.

The client device 102 can include a device ID 210. The client device 102 can identify itself to the intermediary server 108 or the content server 110 with the device ID 210. The device ID 210 can be an alphanumeric string, data string, serial number, media access control (MAC) address, IP address, username or account name, globally unique identifier (GUID), cookie, random or pseudorandom number, or any other type and form of identifier, including combinations of these or other identifiers. For example, the device ID 210 can be a hash of the client device's user agent or MAC address. The device identifier 210 can be fixed to the client device 102. For example, the device ID 210 can be preconfigured in the device by the manufacturer. For example, the device ID 210 can be a manufacturer serial number or MAC address. The device ID 210 can be dynamically set by the client device 102, intermediary server 108, or content server 110. The device ID 210 can be static. The device ID 210 can be updated at predetermined interfaces. For example, a unique or new device identifier 210 can be set for each communication with the intermediary server 108. The device ID 210 can be changed or updated periodically (e.g., hourly, daily, weekly, etc.) or at other intervals (e.g., on restart of the client device, login to an internet service, etc.). The device ID 210 can be associated with one or more other device identifiers 210 (e.g., a device identifier for a mobile device, a device identifier for a home computer, etc.).

The client device 102 can include one or more restricted environments 212. The restricted environments 212 can be a component of the application 208 or can be maintained by the application 208. For example, the application 208 can be a web browser and the web browser can create, maintain, and remove the restricted environments 212 from the memory 206 of the client device 102. The restricted environments 212 can be an application, applet, script, service, daemon, routine, or other executable logic to receive content item parameters and generate parameter lists based on the content item parameters and a client device profile 214. The restricted environment 212 can be a secure storage location within the memory 206. The restricted environment 212 can be or can include a "sandbox" that isolates processor-executable instructions executed within the restricted environment 212 from data stored outside the restricted environment 212 or other processor-executable instructions. The client device 102 can include a different restricted environment 212 for each of the content servers 110 with which the client device 102 interacts. For example, during an earlier data exchange (e.g., an authentication procedure), the content server 110 can provide the client device 102 with processor-executable instructions to store within a restricted environment 212 for the content server 110.

In some implementations, the restricted environment 212 can be a component of a document, resource, or web page executed or rendered by the application 208. For example, the application 208 can be a web browser that receives and renders a web page. The restricted environment 212 can be defined within a frame (e.g., an iframe) of the web page. The frame can include processor-executable instructions (e.g., JavaScript) and the restricted environment 212 can restrict the processor-executable instructions from interacting with other processor-executable instructions or data not contained within (or provided to) the restricted environment 212. The restricted environment 212 can limit resources and network transmissions of the processor-executable instructions executed within the restricted environment 212. The restricted environment 212 can limit content or other requests from the processor-executable instructions. For example, the restricted environment 212 can limit content requests generated by the processor-executable instructions within the restricted environment 212 to only the intermediary server 108. The intermediary server 108 can forward the message to a content server 110 for fulfillment.

The restricted environment 212 can include a client device profile 214. The client device profile 214 can be generated, updated, and maintained by the profile generator 216. The client device profile 214 can be a data structure to store data that a content server 110 can use to identify content items 228 for the client device 102. As described above, the client device 102 can include a different restricted environment 212 for each of the content servers 110. The client device profile 214 within a given restricted environment 212 can include a data that the respective content server 110 can use to identify content items 228 for the client device 102. The client device profile 214 can be or can include an alphanumeric string, data string, serial number, MAC address, IP address, username or account name, GUID, random or pseudorandom number, or any other type and form of identifier, including combinations of these or other identifiers. For example, the client device profile 214 can be a hash of the client device's user agent, MAC address, a demographic, an interest, an intention, a browsing history, or other data related to the client device. The client device profile 214 can include preferences of a user of the client device 102. The user of the client device 102 can set the preference stored in the client device profile 214. For example, during an authentication process with the content server 110, the user can select one or more preferred content types or preferred subject matter. The preferences can be set automatically by the profile generator 216. For example, when the browser renders a web page, the profile generator 216 can receive the uniform resource locator (URL) from the web browser. The profile generator 216 can determine the subject matter of the web page. The profile generator 216 can add the identification of the subject matter to the client device profile 214. A user of the client device 102 can instruct the application 208 to delete the client device profile 214 at regular intervals (e.g., daily, weekly, monthly, etc.) or the application 208 can delete the client device profile 214 at times specified by the user.

The restricted environment 212 can include a profile generator 216. The profile generator 216 can be an application, applet, script, service, daemon, routine, or other executable logic to generate and maintain a client device profile 214. The client device 102 can receive the logic of the profile generator 216 (e.g., the processor-executable instructions of the profile generator 216) for a content server 110. For example, as described further in relation to FIG. 3, the logic can be included in a web page. For example, the logic can be JavaScript within an iframe. The content server 110 can provide the logic to the publisher of the web page, who can include the logic in a content slot or iframe.

The application 208 can provide or transmit data to the profile generator 216. The profile generator 216 can use the data to generate or update the client device profile 214. The user of the client device 102 can control what data the application 208 can provide to the profile generator 216. For example, the application 208 can have a user settings page where the user can whitelist or blacklist data or classes of data that the application 208 provides the profile generator 216. For example, the user can blacklist all URLs associated with a predetermined domain. The data that the application 208 can provide to the profile generator 216, if authorized, can include URLs of web pages viewed by the application 208, indications of subject matter associated with the URL, identifications of content within or displayed in association with the URL, user preferences, IP addresses, client device 102 capabilities (e.g., screen size and resolution information), or any combination thereof. The profile generator 216 can update the client device profile 214 as additional data is received from the application 208.

The restricted environment 212 can include a parameter selector 220. The parameter selector 220 can be an application, applet, script, service, daemon, routine, or other executable logic to generate or update the parameter list 218. As described below, the parameter list 218 can be a data structure that includes settings, requirements, or other parameters that a content server 110 can use to select content. The parameter selector 220 can generate the parameter list 218 in response to receiving a content request. For example, the application 208 can render a web page, the web page can include a content slot, and the content slot can include processor-executable instructions for retrieving content from one of the content servers 110. The application 208 can transmit or provide the content request of the content slot to the restricted environment 212 associated with the content server 110. The request can include one or more parameters for the content item to be returned in response to the request. For example, the request can include dimensions of the content item that should be returned. The parameter selector 220 can add the one or more parameters from the content item to the parameter list 218. For example, the one or more parameters can be concatenated to an array of parameters in the parameter list 218. The parameter selector 220 can select or generate parameters (in addition to or in place of the parameters in the content request) to add to the parameter list 218. The parameter selector 220 can add parameters to the parameter list 218 based on the client device profile 214. For example, as described above, the client device profile 214 can include preferences and configuration information for the client device 102. The parameter selector 220 can select parameters based on the preferences or configuration information stored in the client device profile 214. For example, the client device profile 214 can indicate a user's subject matter preferences, such as an interest in automobiles. In this example, the parameter selector 220 could append "automobiles" or an identifier thereof to the parameter list 218 to indicate to the content server 110 that the user has an interest in automobiles and the content server 110 should select a content item 228 related to automobiles.

The restricted environment 212 can include a parameter list 218. The parameter list 218 can be a string, array, formatted list, or other data structure generated by the parameter selector 220. The parameter selector 220 can generate the parameter list 218 in response to the restricted environment 212 receiving a content request. For example, the application 208 can be a web page that renders a web page including a content slot. The content slot can include processor-executable instructions configured to interface with a restricted environment 212 stored on the client device 102. For example, the processor-executable instructions of the content slot and the processor-executable instructions within the restricted environment 212 can be provided to client device 102 from the same origin (e.g., content server 110). The restricted environment 212 can restrict processor-executable instructions within the restricted environment 212 (e.g., an instance of the profile generator 216 or parameter selector 220) from interacting with processor-executable instructions in a web page unless the processor-executable instructions within the web page and restricted environment 212 are from the same content server 110. For example, the restricted environment 212 can include a content server identifier and the application 208 can prevent the restricted environment 212 from executing processor-executable instructions from a web page content slot, for example, unless the processor-executable instructions is associated with the same content server identifier. The parameter selector 220 can add parameters to parameter list 218 that can include or relate to user preferences, client device 102 configurations or capabilities (e.g., a user agent executed by the client device 102), language preferences, client device 102 location, browsing history, subject matter preferences, or any combination thereof. For example, the parameter list 218 can include an indication of a location so that the content server 110 can select content items 228 relevant to the current location of the client device 102.

Also as illustrated in FIG. 2, the system 100 can include an intermediary server 108. As with client devices 102, intermediary server 108 can include one or more processors 200, memory 206, network interfaces 202, and I/O interfaces 204. The intermediary server 108 can communicate with the client device 102 and the content servers 110 via the network 106. The memory 206 of the intermediary server 108 can store one or more applications for execution by the processor 200 of the intermediary server 108. For example, the intermediary servers 108 can include applications that enable the intermediary servers 108 to function as a proxy between the client device 102 and the content servers 110.

The intermediary server 108 can include an aggregator 224. The aggregator 224 can be an application, applet, script, service, daemon, routine, or other executable logic to aggregate requests received from client devices 102. The intermediary server 108 can receive content requests from client devices 102 for forwarding onto the content servers 110. Each of the content requests can include a parameter list 218. The aggregator 224 and the intermediary server 108 can protect the privacy of the client device 102 from the content servers 110. For example, the intermediary server 108 and the aggregator 224 can mask, hide, or otherwise prevent a receiving content server 110 from knowing the IP address of the client device 102 from which a content request originated. In some implementations, content server 110 may be able to identify a client device 102 based on the parameters within the parameter list 218 transmitted in the content request. For example, a specific combination of parameters (e.g., {zipCode:12345, interest:automobiles, agent: chrome}) could be shared by a population of client devices 102 or by a small population of client devices 102. In instances where the parameter list is shared by only a small population of client devices 102, a content server 110 could use the parameter list 218 to identify the client device 102.

The aggregator 224 can prevent the identification of the client device 102 by the content server 110 via specific parameter lists by ensuring that the parameter list 218 meets aggregation thresholds before transmitting or forwarding the parameter list 218 to a content server 110. The aggregation thresholds can prevent parameter lists from being too specific to a client device 102. For example, if only a single client device 102 makes a request for content within a predetermined time frame, it can be possible to identify the client device 102 from the request. However, requiring aggregation thresholds, the aggregator 224 can prevent the identification of a client device 102 from a request because at least the number of client devices 102 of the aggregation threshold also made the request. For example, the aggregator 224 can save an indication of the parameter list 218 to the aggregation table 226. In some implementations, the aggregator 224 can generate a hash (e.g., a crypto-hash or SHA-256 hash) of the parameter list 218 that is stored to the aggregation table 226. The aggregator 224 can save the indication of the parameter list 218 to the aggregation table 226 in association with a time stamp. The aggregator 224 can save an indication of the parameter list 218 to the aggregation table 226 as a full list. The full list can hashed with a crypto-hash or encrypted prior to storage as a full list. The aggregator 224 can parse the parameter list 218 to identify individual parameters within the parameter list 218 and save an indication of the individual parameters to the aggregation table 226. For example, an example parameter list could be saved to the aggregation table 226 as hash ({zipCode:12345, interest:automobiles, agent:chrome}) or as the three individual entries hash({zipCode:12345}), hash ({interest:automobiles}), and hash({agent:chrome}).

Based on the time stamps associated with the parameters saved to the aggregation table 226, the aggregator 224 can determine a count or frequency at which the individual parameters or combination of parameters are received in parameter lists 218. The aggregator 224 can determine the count for a predetermined time window (e.g., the past hour, day, week, or month). When the intermediary server 108 receives a content request, the aggregator 224 can add the parameters of the parameter list 218 to the aggregation table 226 and determine if the parameters satisfy an aggregation threshold. The aggregator 224 can determine whether the parameters were received greater than a predetermined number of times within the predetermined time window. As one example, the aggregation threshold can be 50/day. The aggregator 224 can determine if the combination of parameters in the parameter list 218 was received more than or less than 50 times in the last day. In some implementations, if the parameter list 218 meets the aggregation threshold (e.g., was received more than 50 times in the last day in the above example), the intermediary server 108 can forward the request and parameter list 218 to a content server 110. In some implementations, if the parameter list 218 does not meet the aggregation threshold, the aggregator 224 can pass the parameter list 218 to the parameter selector 220 of the intermediary server 108. In some implementations, if the parameter list 218 does not meet the aggregation threshold, the intermediary server 108 can remove the parameter list 218 from the content request and forward the modified content request to the content server 110. In this example, the content server 110 may select a generic content item because the content server 110 will not receive a parameter list that the content server's content selector 230 can use to select a content item 228 for fulfilling the content request.

The intermediary server 108 can include a parameter selector 220. The intermediary server's parameter selector 220 can perform all the functions described in relation to the client device's parameter selector 220 and the client device's parameter selector 220 can perform all the functions described in relation to the intermediary server's parameter selector 220. In some implementations, the parameter selector 220 can refine, update, change, or remove parameters from the parameter list 218 received from a client device 102. For example, when the aggregator 224 determines that the parameter list 218 does not meet the aggregation threshold, the aggregator 224 can forward the parameter list 218 to the parameter selector 220 for updating. The parameter selector 220 can remove parameters from the parameter list 218 to make the parameter list 218 more generic. The parameter selector 220 can update parameters from the parameter list 218 to make the parameter list 218 more generic or less specific. For example, if the parameter is {zipCode:90001}, the parameter selector 220 can update the parameter to a more generic parameter such as {location: California}.

The intermediary server 108 can include an aggregation table 226. As described above, the aggregator 224 can store indications of parameters or parameter lists 218 into the aggregation table 226. The aggregation table 226 can be a table, hash table, database, or other collection of data. Each parameter or parameter list 218 can be stored in the aggregation table 226 with a time stamp. The aggregator 224 can purge or delete entries in the aggregation table 226 older than a predetermined threshold (e.g., 1 day, 1 week, 1 month, or 3 months). Each parameter or parameter list 218 can be stored as an entry in the aggregation table 226 and the aggregator 224 can process through the aggregation table 226 to count occurrences of parameters or parameter lists 218. In some implementations, the aggregation table 226 can store only entries for unique parameters or parameter lists. For example, when entering a parameter or parameter list 218 into the aggregation table 226, if the aggregator 224 determines the parameter or parameter list 218 is not unique (e.g., the parameter or parameter list 218 is already in the list), the aggregator 224 can increment a count value stored in the aggregation table 226 in association with the unique parameter or parameter list 218.

The intermediary server 108 can include a content provider selector 222. The content provider selector 222 can include applications, servers, services, daemons, routines, or other executable logic. The content provider selector 222 can be configured to select content servers 110 from a list of content servers 110. For example, the content provider selector 222 can select a content server 110 from a list of content servers 110 using a round robin or other load balancing system, or via an auction-based system. The content provider selector 222 may be configured to transmit requests to and receives responses from the content servers 110, such as bids for opportunities to provide content to a client device 102. The content servers 110 can be configured to generate or forward a content request from the client device 102 to a selected content server 110. The content request can include the parameter list 218 (or an updated version thereof). In some implementations, the content provider selector 222 can be a component of a second intermediary server 108. For example, the client device 102 can transmit the request to a first intermediary server 108 that can include the aggregator 224. The first intermediary server 108 can update the parameter list, if needed, and forward the updated parameter list to the second intermediary server 108. The second intermediary server 108 can identify one or more content servers 110 via the content provider selector 222 and forward the request to the selected content servers 110.

Also as illustrated in FIG. 2, the system 100 can include one or more content servers 110. Each of the content servers 110 can include one or more computing devices connected to the network 106 and configured for providing content items 228 to client devices 102 via the intermediary server 108. The content items 228 provided by the content servers 110 can be referred to as secondary content because the content items 228 can be rendered into content slots of primary content, such as a web page. In some implementations, the content items 228 can be or can include primary content. A content server 110 can be referred to variously as a content provider, server, web server, data server, publisher, service provider, or by other similar terms. The content server 110 can include a plurality of computing devices configured as a server farm or cloud, and may include routers, load balancers, network address translators, firewalls, or other such devices. The content servers 110 can be computer servers (e.g., FTP servers, file sharing servers, web servers, etc.) or combinations of servers (e.g., data centers, cloud computing platforms, etc.). The content servers 110 can provide any type and form of content, including text, images, video, audio, multimedia, or other data, or any combination of these. The content items 228 can include live media content, prerecorded media content, rendered content, movies, television shows, podcasts, video blogs, video games or other interactive content, advertising in any format, social media, or any other type and form of content.

The content server 110 can include one or more processors 200, network interfaces 202, I/O interfaces 204, and/or memory 206. The content server 110 can include a content selector 230. The content selector 230 can include an application, service, server, daemon, routine, or other executable logic for selecting content items 228 for delivery to a client device 102. The content selector 230 can receive the parameter list 218 in the content request from the intermediary server 108. The content selector 230 can parse the parameter list 218 to identify the parameters within the parameter list 218. For example, the parameter list 218 can be encoded into a URL transmitted from the intermediary server 108 to the content server 110. The parameters can be encoded into the URL according to a schema shared between the intermediary server 108 and the content selector 230 that enable the content selector 230 to parse the parameters from the parameter list 218.

The content selector 230 may select content items 228 for delivery to the client device 102 based on the parameters parsed from the parameter list 218 received in the content request. For example, the parameters may include information about device capabilities (e.g., screen resolution or orientation, color depth, bandwidth, etc.) or any other such information for selection of customized content. The information can be indexed in the database by one or more of the parameters. Responsive to selecting the content items 228, the content selector 230 can push, stream, or otherwise transfer the content items 228 to the client device 102. The content server 110 can transmit the content items 228 directly to the client device 102 or indirectly to the client device 102 via the intermediary server 108. The content items 228 can be any type and form of data, including audio, video, animations, text, multimedia, still or animated graphics, executable scripts, or any other type and form of content. Each item of content items 228 can be associated with tags, identifiers, ULRs, or processor-executable instructions. For example, each content items 228 can include processor-executable instructions such that when the application 208 renders and displays the content items 228, selection (e.g., user selection or clicking) of the rendered content items 228 can redirect the application 208 to a URL identified by the content items 228. For example, the content items 228 can include a HTML tags that identify the content items 228 as containing a web link (e.g., URL) to a second web page.

Figure 3:
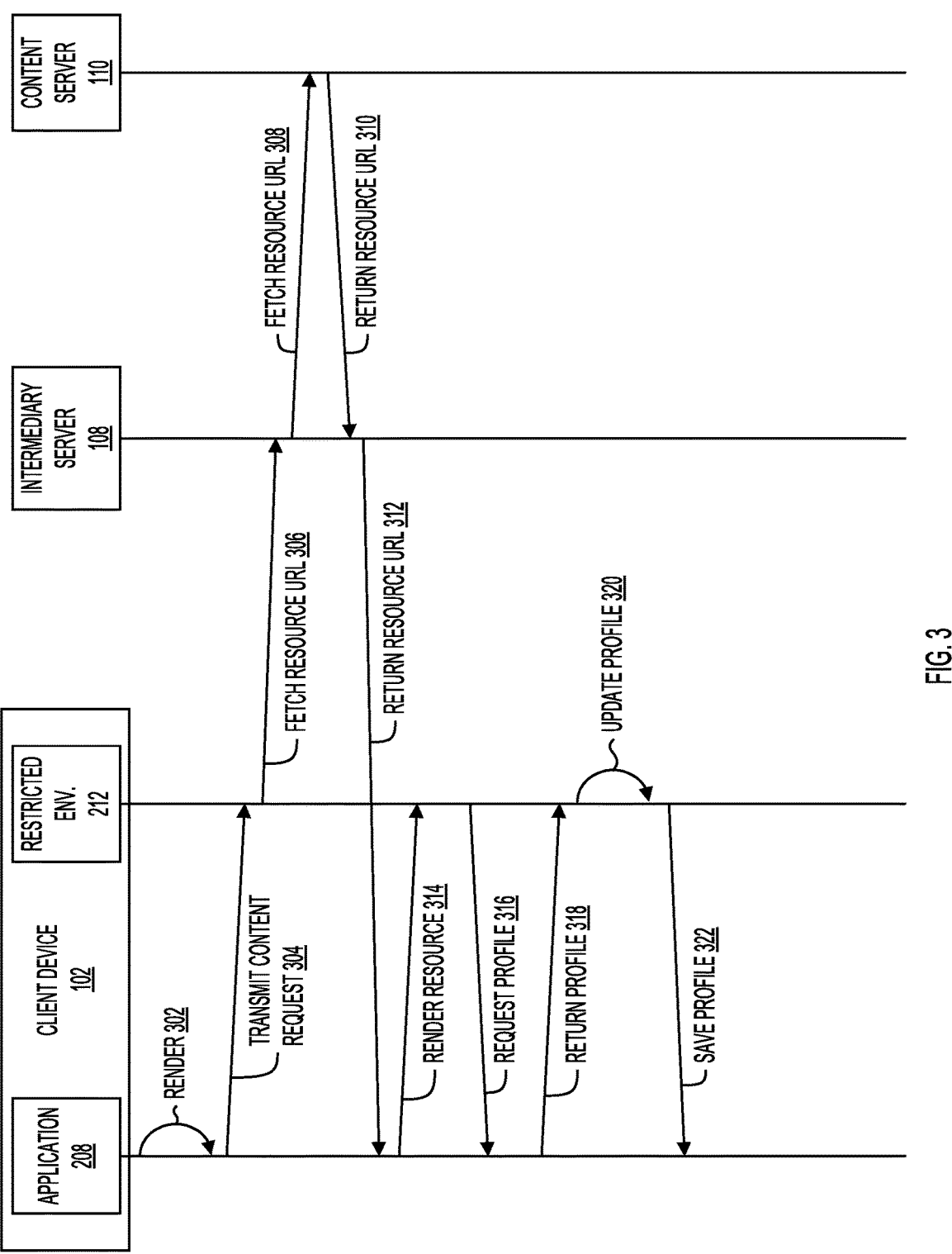
FIG. 3 illustrates a flow diagram to configure restricted environments in the example network and device environment illustrated in FIG. 1, according to some implementations.

FIG. 3 illustrates a flow diagram 300 to configure restricted environments in a networked environment. The flow diagram 300 illustrates the steps performed by the application 208 and restricted environment 212 on a client device 102, an intermediary server 108, and a content server 110. In one example, the application 208 can be a web browser executed by the client device 102. The flow diagram 300 begins with the rendering of a web page (step 302). The web page can include one or more content slots. The content slots can include processor-executable instructions (e.g., JavaScript). The processor-executable instructions contained within the web page can include processor-executable instructions that causes the application 208 to generate a restricted environment 212 at the client device 102 for the content server 110 that provided the processor-executable instructions contained within the web page. When first generated, the restricted environment 212 may not include a client device profile 214 from which the parameter selector 220 can generate a parameter list 218. In this case, the below-described content request may not include a parameter list 218 and the content server 110 can return a generic content item 228. The content item 228 can be generic in that it was not selected based on one or more parameters from the client device 102.

The application 208 can execute the processor-executable instructions within the content slot. When rendering the web page, the application 208 can generate a content request that is passed to the restricted environment 212 (step 304). The restricted environment 212 can generate a parameter list 218 based on the content request. The restricted environment 212 can encode the content request as a fetch request. The restricted environment 212 can encode the parameter list 218 as a URL that is included in the fetch request.

The restricted environment 212 can transmit the fetch request to the intermediary server 108 (step 306). In some implementations, the restricted environment 212 can provide the fetch request to the application 208, which can transmit the request to the intermediary server 108. The restricted environment 212 can transmit the request to the intermediary server 108 through any suitable protocol, such as through a HTTPs request or RESTful request.

The intermediary server 108 can receive the request and forward the request to the content server 110 (step 308). As described further in relation to FIGS. 2 and 5, among others, the intermediary server 108 may only forward the request to the content server 110 if the intermediary server 108 determines that the parameter list 218 satisfies an aggregation threshold. In some implementations, if the intermediary server 108 determines that the parameter list 218 does not satisfy the aggregation threshold, the intermediary server 108 can remove, update, or change one or more parameters from the parameter list 218 such that the updated parameter list 218 satisfies the aggregation threshold. In some implementations, the intermediary server 108 can remove the parameter list 218 from the request such that the content server 110 selects a generic content item in response to the request rather than a content item based on parameters and tailored to the client device 102.

The content server 110 can select a content item and forward the content item to the intermediary server 108 (step 310). The content server 110 can transmit a content item to the intermediary server 108 for forwarding to the client device 102. In some implementations, the content item can be a URL that identifies the location of content. For example, the content item can be a URL to a resource that, when rendered by the application 208, retrieves the content from the location identified by the URL.

The intermediary server 108 can forward the content item to the application 208 (step 312). In some implementations, the request transmitted to the intermediary server 108 by the restricted environment 212 can include a request identifier. When receiving the request, the intermediary server 108 can store the request identifier in a database in association with an IP address of the client device 102 that provided the request. The intermediary server 108 can include the request identifier in the request forwarded to the content server 110 but can remove identifying information about the client device 102 from the request, such as the client device's IP address. The content server 110 can include the request identifier in the response at step 310. The request identifier can indicate to the intermediary server 108 to which client device 102 (and the IP address thereof) the return response from the content server 110 should be forwarded. For example, the intermediary server 108 can create a hash of the request identifier as a key to a lookup table to identify the IP address stored in association with the request identifier. The intermediary server 108 can add, for example, the IP address as the destination of the data packets that form the return response.

At step 314, the application 208 can render the returned resource. The application 208 can render the returned resource (e.g., content item) into the content slot of the web page for which the request was generated. At step 316, the restricted environment 212 can request the profile. In some implementations, the steps 316-322 can occur in parallel with or after the steps 304-314. Also referring to FIG. 2, the profile can be the client device profile 214. The restricted environment 212 can request the profile to update the profile based on the web page rendered at step 302, the content item returned by the content server 110, or a combination thereof.

The profile generator 216 of the restricted environment 212 can request the client device profile 214 from the application 208. For example, the application 208 can manage the local storage of the restricted environment 212 to the client device 102. In some implementations, the client device profile 214 can be stored within the restricted environment 212 and the profile generator 216 can retrieve the client device profile 214 from the restricted environment 212. The restricted environment 212 can request the client device profile 214 through an application programming interface (API) call made to the application 208 or through one or more hooks made available by the application 208. At step 316, the application 208 can return the requested profile. The application 208 can read the client device profile 214 from the memory of the client device 102 and provide the client device profile 214 to the restricted environment 212.

At step 320, the restricted environment 212 can update the profile. The profile generator 216 can update the client device profile 214. The profile generator 216 can update the client device profile 214 based on the web page rendered at step 302 (e.g., the URL of the web page, subject matter of the web page, title of the web page, or other content contained therein); the content item returned by the content server 110 (e.g., the URL of the content item, subject matter of the content item, identifier of the content item, or an indication of whether the content item was viewed or clicked by the user); the time of day the web page or content item was requested, parameters or content included in, but not displayed through rendering, the web page or content item (e.g., metadata and tags); or a combination thereof. In some implementations, one of the web page or the content item can include a tag or other identifier to the profile generator 216 that the client device profile 214 should not be updated based on the web page or content item containing the tag. For example, web pages including sensitive information such as financial or health information can include the tag indicated the client device profile 214 should not be updated based on the content of the respective web pages. In some implementations, the profile generator 216 can determine whether the web page is whitelisted or blacklisted before updating the client device profile 214 based on the web page. At step 322, the restricted environment 212 can save the updated profile. The restricted environment 212 can save the updated client device profile 214 to the restricted environment 212 or the restricted environment 212 can pass the updated client device profile 214 to the application 208, which can save the updated client device profile 214 to a portion of memory maintained for the restricted environment 212 by the application 208.

Figure 4:
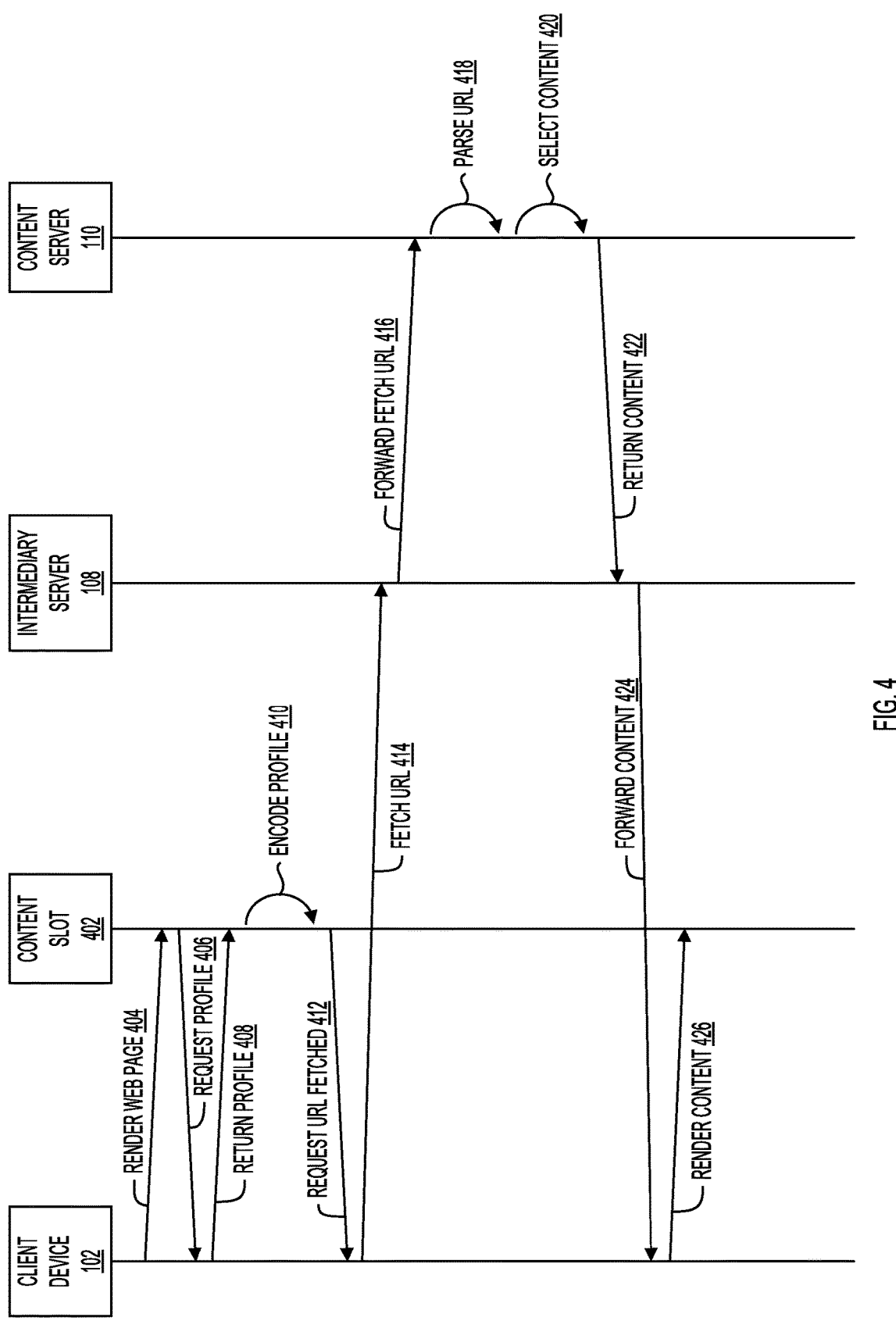
FIG. 4 illustrates a flow diagram to exchange data in the example network device environment illustrated in FIG. 1, according to some implementations.

FIG. 4 illustrates a flow diagram 400 of selecting custom content in response to a request. At step 404, the client device 102 can render a web page. Also referring to FIG. 2, among others, the application 208 can render the web page. For example, a URL of a web page can be entered into application 208 and the application 208 can fetch the web page at the URL and then render the web page. Rendering the web page can display the web page via the application. The web page can include one or more content slots 402. The content slots 402 can include processor-executable instructions for requesting or retrieving content for the application 208 to render into the content slots 402. In some implementations, the content slot 402 can include processor-executable instructions that are provided to the processor-executable instructions, just as JavaScript, to interact with the restricted environment 212. For example, the content slot 402 can request the client device profile 214 from the restricted environment 212.

At step 406, the content slot 402 can request a profile. The content slot 402 can request the client device profile 214 from the restricted environment 212. The application 208 can authorize the content slot 402 to receive content or otherwise interact with the restricted environment 212. For example, the application 208 can authorize the content slot 402 to only interact with the restricted environment 212 that has the same origin (e.g., content server 110) as the content slot 402. For example, the content slot 402 can be configured to request content items from a predetermined content server 110. As described above, the application 208 can generate different restricted environments 212 for each of the content servers 110 when the application 208 renders a content slot 402 that includes processor-executable instructions from the respective content servers 110. The application 208 can limit the content slot 402 to interacting with the restricted environment 212 associated with the same content server 110 that is associated with the content server 110. In some implementations, the content slot 402 can request that the restricted environment 212 can transmit the content request to the content provider on behalf of the content slot 402.

At step 408, the client device 102 can return the profile to the content slot 402. The restricted environment 212 can read the client device profile 214 from memory and return the client device profile 214 to the content slot 402. In some implementations, the restricted environment 212 can return a parameter list 218, based on the client device profile 214, to the content slot 402. At step 410, the content slot 402 can encode the profile. For example, the content slot 402 can concatenate the profile as a parameter-value string in a URL. The content slot 402 can include the profile (or parameter list 218) as a URL. For example, the URL can include a base URL of the content server 110. The content slot 402 can concatenate one or more of the parameters to the base URL as URL parameters to form a resource URL. At step 412, the content slot 402 can request that the resource URL be fetched. The content slot 402 can request that the application 208 fetch the resource (e.g., content item) located at the resource URL.

At step 414, the client device 102 can fetch the resource URL. The client device 102, via the application 208, can request the resource by transmitting the URL to the intermediary server 108. The application 208 can transmit the request to the intermediary server 108 using any suitable protocol, such as through a HTTPs request or RESTful request. At step 416, the intermediary server 108 can forward the request to the content server 110. As described above and further in relation to FIG. 5, the intermediary server 108 can forward the request to the content server 110 subject to the parameters encoded in the resource URL satisfying an aggregation threshold.

At step 418, the content server 110 can receive the fetch request from the intermediary server 108 and can parse the URL. The content server 110 can parse the resource URL to identify the one or more parameters the content slot 402 encoded into the resource URL at step 410. At step 420, the content server 110 can select content. Also referring to FIG. 2, among others, the content selector 230 can use the one or more parsed parameters to select a content item 228. The content selector 230 can select the content item 228 based on the parameters. For example, the parameters can identify a size, type, and subject matter of the content item 228 to be selected. The content server 110 can also use, in addition to the parameters, a load balancing system (e.g., a round robin system) or an auction-based system to select the content item 228. At step 422, the content server 110 can transmit the selected content item to the intermediary server 108. At step 424, the intermediary server 108 can forward the selected content item to the client device 102. As described above, the request transmitted to the intermediary server 108 at step 414 can include a request identifier. The content server 110 can include the request identifier with the returned content at step 422. At step 424, the intermediary server 108 can use the request identifier to determine to which client device 102 the content item should be forwarded. The intermediary server 108 can forward the content item to the client device 102 identified by the request identifier. At step 426, the client device 102 can receive the content item and can render the content item. For example, the application 208 can render the content item into the content slot 402 that generated the request for which content item was selected.

Figure 5:
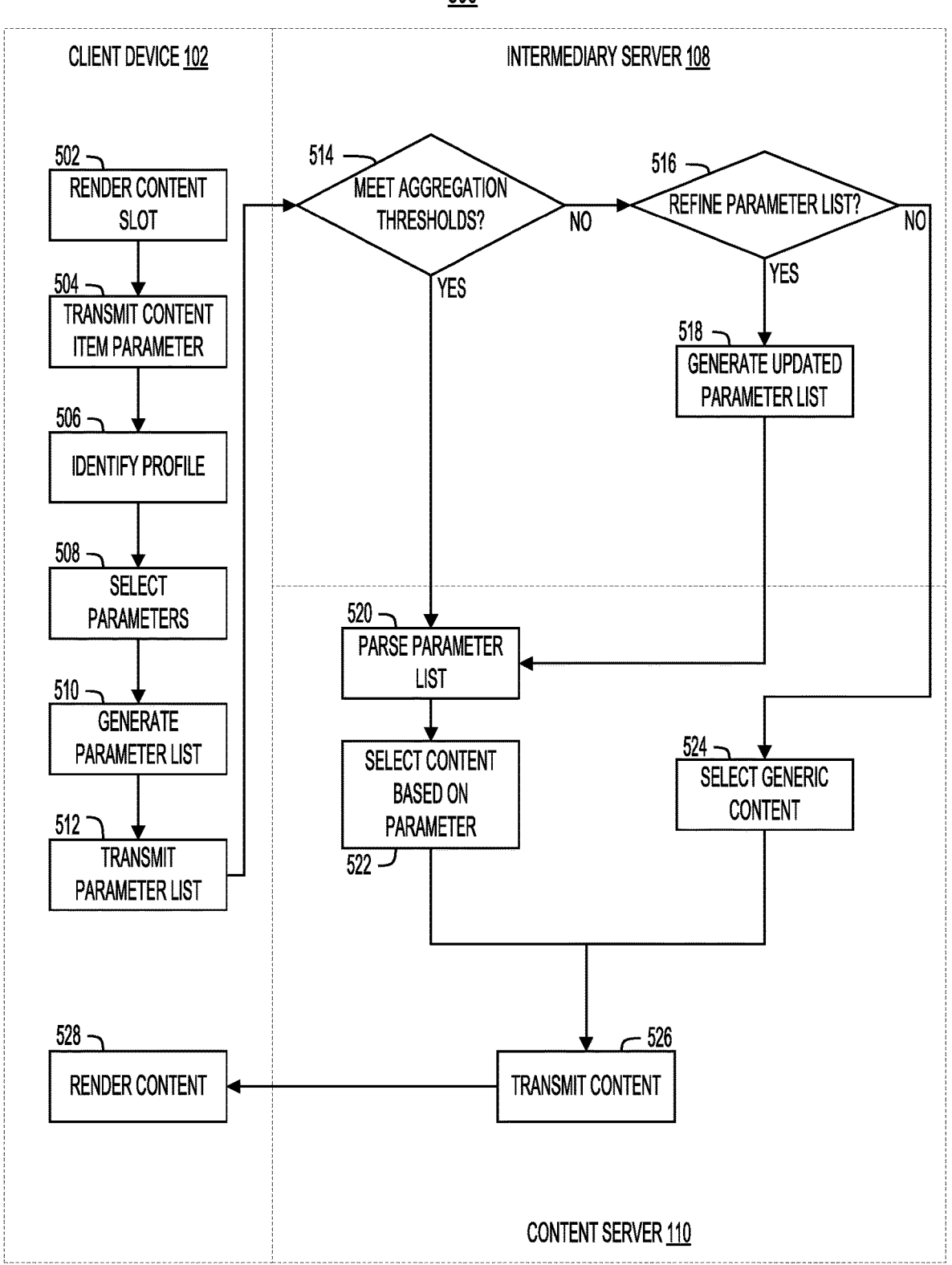
FIG. 5 illustrates a block diagram of an example method to exchange data in the example network device environment illustrated in FIG. 1, according to some implementations.

FIG. 5 illustrates a block diagram of an example method 500 to exchange data in a networked environment. FIG. 5 illustrates steps or actions performed by the client device 102, the intermediary server 108, and content server 110. The method 500 can include rendering a content slot (step 502). Also with reference to FIG. 2, among others, the client device 102 can execute an application 208. The application 208 can be a web browser. The web browser can receive or request web pages and can render the web pages to display the web pages to a user. The web pages can include one or more content slots. The content slots can include processor-executable instructions for requesting content from a content server 110 to be rendered by the application 208 into the content slot.

Based on rendering the content slot, the method 500 can include transmitting a content item parameter (step 504). The application 208 can execute the processor-executable instructions contained within the content slot and execution of the processor-executable instructions can include the application 208 to transmit or provide a content item parameter to the restricted environment 212. The content item parameter can include an identifier of the content slot, a request identifier, a base resource URL (e.g., a URL for requesting content), a URL of the web page, or a combination thereof.

The method 500 can include identifying a profile (step 506). The profile can be a client device profile 214. The client device profile 214 can be stored within or accessed via the restricted environment 212. In some implementations, the content slot can be associated with a content server 110. For example, the processor-executable instructions within the content slot for requesting content for the content slot can be provided by the content server 110. To identify the client device profile 214, the application 208 can identify the content server 110 associated with the content slot and then select or identify the restricted environment 212 associated with the content server 110.

The method 500 can include selecting parameters (step 508). The parameter selector 220 within the identified restricted environment 212 can select the parameters. In some implementations, the parameter selector 220 can select each of the parameters associated with the client device profile 214. In some implementations, the parameter selector 220 can select a portion of the parameters associated with the client device profile 214. The parameter selector 220 can select the parameters based on the content item parameters. For example, the content item parameters can indicate a subject matter of the web page or a size of content slot. The parameter selector 220 can, for example, select parameters that indicate preferences associated with the indicated subject matter of the web page. In some implementations, the parameter selector 220 can select parameters to meet the aggregation thresholds of the intermediary server 108. For example, the parameter selector 220 may not select a combination of specific parameters because the combination would not pass the aggregation threshold of the intermediary server 108. Rather, the parameter selector 220 may include one or more generic parameters such that the combination of parameters meets the aggregation threshold of the intermediary server 108.

The method 500 can include generating a parameter list (step 510). The parameter selector 220 can generate a parameter list 218 that includes the parameters selected as step 508. The restricted environment 212 can encode the parameter list 218 as a URL or URL parameters. The encoded parameter list 218 can be appended to a base resource URL (e.g., a URL for requesting content). For example, the base resource URL can be the URL of the content server 110 (e.g., www.example.com). In an example where the selected parameters are a location and an interest, the parameter list 218 can be encoded as "zipCode: 12345?interest:automobiles". The restricted environment 212 can combine the base URL and the encoded parameter list 218 to form a URL for requesting content from the content server 110, "www.example.com/?zipcode=12345&interest=automobiles", in the above example.

The method 500 can include transmitting the parameter list (step 512). The restricted environment 212 can include the parameter list as encoded values in a URL. The restricted environment 212 can pass the URL to the application 208, which can transmit the URL to the intermediary server 108. The application 208 can transmit the URL to the intermediary server 108 as a HTTPs request or RESTful request.

The method 500 can include determining whether the parameters of the parameter list meet an aggregation threshold (step 514). The aggregation threshold can indicate a number of times, per time window, that a parameter or combination of parameters must be received by the intermediary server 108 in content requests. For example, the aggregation threshold for a combination of parameters can be 50/day indicating that when the combination of parameters is received in a request, the combination of parameters must be included in 50 requests within the last 24 hours (from different web browsers) for the intermediary server 108 to determine that the combination of parameters pass the aggregation threshold. If the parameters or combination of parameters received by the intermediary server 108 pass the aggregation threshold, the method 500 can continue to step 520. If the parameters or combination of parameters received by the intermediary server 108 do not pass the aggregation threshold, the method 500 can continue to step 516. The aggregation threshold can include a plurality of dimensions. For example, the aggregation threshold can include a plurality of different thresholds for different parameters. In some implementations, each of the thresholds of the different dimensions have to be satisfied for the parameters of the parameter list to satisfy the aggregation threshold.

The method 500 can include determining to refine the parameter list (step 516). In response to the parameters not passing the aggregation threshold, the intermediary server 108 can determine whether the parameter list should be refined. In some implementations, the intermediary server 108 can include a blacklist or whitelist of URLs associated with content servers 110 that restrict or allow updating parameter lists in requests the intermediary server 108 sends to the respective content server 110. In some implementations, the URL transmitted to the intermediary server 108 by the client device 102 can include a URL value indicating whether the intermediary server 108 is authorized to update the parameters or parameter list. If the intermediary server 108 is authorized to update the parameter list, the method 500 continues to step 518 and if the intermediary server 108 is not authorized to update the parameter list the method 500 continues to step 524.

The method 500 can include generating an updated parameter list (step 518). The intermediary server 108 can update the parameter list by making one or more of the parameters more generic. For example, a location parameter could be changed from a zip code to the state that contains the zip code. A parameter indicating an interest in a specific brand of automobile could be made more generic by changing the parameter to indicate an interest in automobiles. The method 500 can include updating the parameter list by removing one or more parameters from the parameter list. For example, the intermediary server 108 can determine the frequency with which the intermediary server 108 receives each of the parameters in the parameter list. The intermediary server 108 can rank the parameters based on the frequency. In some implementations, the intermediary server 108 could remove the parameters that have a frequency below a predetermined threshold. For example, the intermediary server 108 could remove parameters from the parameter list that rarely occur thus making the parameters or combination of parameters more unique and attributable to a specific client device 102. In some implementations, the intermediary server 108 can keep only the parameters that have a frequency above a predetermined threshold. For example, the intermediary server 108 could only keep the most commonly occurring parameter form the parameter list. Modifying the parameters based upon frequency in this way can improve efficiency of selecting parameters.

Returning to step 516, if the intermediary server 108 determines that the parameters do not satisfy the aggregation threshold and the intermediary server 108 is not authorized to update the parameter list, the intermediary server 108 could remove or strip the parameter list from the request URL. For example, the intermediary server 108 could strip the encoded parameters to convert "www.example.com: 12345?interest:automobiles" to "www.example.com". As described further in relation to step 524, without the parameter list, the content server 110 selects a generic content item to return to the client device 102.

The method 500 can include parsing the parameters list (step 520). Responsive to the intermediary server 108 forwarding the request and parameter list (or updated parameter list) to the content server 110, the content server 110 can receive and parse the parameters from the parameter list. The parameters can be encoded into the parameter list according to a schema shared between the intermediary server 108 and the content server 110 that enables the content server 110 to parse the parameters from the parameter list.

The method 500 can include selecting content based on the parameters (step 522). Also referring to FIG. 2, among others, the content selector 230 can use the one or more parsed parameters to select a content item 228. The content selector 230 can select the content item 228 based on the parameters. For example, the parameters can identify a size, type, and subject matter of the content item 228 to be selected. In some implementations, the content server 110 can use the parameters as keys to lookup content items associated with the respective parameters. In some implementations, the content server 110 can select a content item that corresponds to each of the parsed parameters (e.g., the content server 110 searches for a content item associated with parameter 1 AND parameter 2 AND parameter 3) or that corresponds to one or more of the parsed parameters (e.g., the content server 110 searches for a content item associated with parameter 1 OR parameter 2 OR parameter 3).

The method 500 can include selecting a generic content item (step 524). As described above, if the parameter list does not satisfy the aggregation threshold, the intermediary server 108 may pass the request to the content server 110 without the parameter list. Because the request does not include a parameter list, the content server 110 cannot select a content item that is customized to the client device 102. The content server 110 can select a generic content item that is selected at random, by a round robin system, or by an auction system.

The method 500 can include transmitting the content (step 526). The content item that can be selected based on the parameter list at step 522 or generically selected at step 524 can be transmitted back to the intermediary server 108. The intermediary server 108 can forward the content item to the client device 102. In some implementations, the content server 110 can transmit the content item directly (e.g., not through the intermediary server 108) to the client device 102.

The method 500 can include rendering the content (step 528). Responsive to the client device 102 receiving the content (from the content server 110 or intermediary server 108), the client device 102 can render the content item into the content slot rendered at step 502.

Accordingly, a method to exchange data in a networked system can include storing, by a web browser executed by a client device, a client device profile that can include a plurality of client device parameters and processor-executable instructions to generate a content request in a restricted environment of the client device. The restricted environment can be associated with a content server. The method can include transmitting, by the web browser, a content item parameter to the restricted environment based on the web browser receiving a web page. The method can include generating, by the web browser executing the processor-executable instructions stored in the restricted environment, a parameter list based on the client device profile and the content item parameter. The method can include transmitting, by the web browser, the parameter list to a proxy server. The method can include receiving, by the web browser, a content item to render in a content slot of the web page based on the proxy server determining an aggregate value of at least one parameter in the parameter list satisfies a predetermined threshold.

In some implementations, the method can include generating, by the web browser, a plurality of restricted environments. Each of the plurality of restricted environments can include a respective client device profile and a respective set of processor-executable instructions to generate the content request. Each of the plurality of restricted environments can be associated with a different content server. In some implementations, the method can include identifying, by the web browser, a content server associated with the content slot of the web page. The method can include selecting, by the web browser, the restricted environment from a plurality of restricted environments based on an identification of the content server associated with the content slot of the web page.

The content item parameter can include at least one of an identifier of the content slot, a request identifier, a base resource URL, or a URL of the web page. The method can include receiving, by the web browser, a second web page that can include a second set of processor-executable instructions to generate the content request. The second set of processor-executable instructions can be provided by the content server. The method can include updating, by the web browser, the processor-executable instructions stored in the restricted environment based on the second set of processor-executable instructions.

The method can include transmitting, by the web browser, a second content item parameter to the restricted environment based on the web browser receiving a second web page. The method can include generating, by the web browser executing the processor-executable instructions stored in the restricted environment, a second parameter list based on the client device profile and the second content item parameter. The method can include transmitting, by the web browser, the second parameter list to the proxy server. The method can include receiving, by the web browser, a generic content item to render in a content slot of the second web page based on the proxy server determining a second aggregate value of at least one parameter in the second parameter list does not satisfy the predetermined threshold.

In some implementations, the method can include selecting a portion of client device parameters to include in the parameter list to satisfy the predetermined threshold. The content item can be selected based on at least one of the parameters in the parameter list. The method can include receiving the content item from the proxy server responsive to the proxy server receiving the content item from the content server. The method can include encoding the parameter list as URL parameters, generating a request URL by concatenating the URL parameters to a base URL included in the content item parameter, and transmitting the request URL to the proxy server.

According to at least one aspect of the disclosure, a system to exchange data in a networked can include a web browser executed by one or more processors of a client device. The web browser can maintain one or more restricted environments. The web browser can store, in a restricted environment, a client device profile that can include a plurality of client device parameters and processor-executable instructions to generate a content request. The restricted environment can be associated with a content server. The web browser can transmit a content item parameter to the restricted environment based on the web browser receiving a web page. The web browser can generate, based on execution of the processor-executable instructions stored in the restricted environment, a parameter list based on the client device profile and the content item parameter. The web browser can transmit the parameter list to a proxy server. The web browser can receive a content item to render in a content slot of the web page based on the proxy server determining an aggregate value of at least one parameter in the parameter list satisfies a predetermined threshold.

In some implementations, the web browser can generate a plurality of restricted environments. Each of the plurality of restricted environments can include a respective client device profile and a respective set of processor-executable instructions to generate the content request. Each of the plurality of restricted environments can be associated with a different content server. The web browser can identify a content server associated with the content slot of the web page. The web browser can select the restricted environment from a plurality of restricted environments based on an identification of the content server associated with the content slot of the web page.

In some implementations, the content item parameter can include at least one of an identifier of the content slot, a request identifier, a base resource URL, or a URL of the web page. The web browser can receive a second web page that can include a second set of processor-executable instructions to generate the content request. The second set of processor-executable instructions can be provided by the content server. The web browser can update the processor-executable instructions stored in the restricted environment based on the second set of processor-executable instructions.

In some implementations, the web browser can transmit a second content item parameter to the restricted environment based on the web browser receiving a second web page. The web browser can generate, by executing the processor-executable instructions stored in the restricted environment, a second parameter list based on the client device profile and the second content item parameter. The web browser can transmit the second parameter list to the proxy server. The web browser can receive a generic content item to render in a content slot of the second web page based on the proxy server determining a second aggregate value of at least one parameter in the second parameter list does not satisfy the predetermined threshold.

In some implementations, the web browser can select a portion of the client device parameters to include in the parameter list to satisfy the predetermined threshold. The content item can be selected based on at least one of the parameters in the parameter list. The web browser can receive the content item from the proxy server responsive to the proxy server receiving the content item from the content server. The web browser can encode the parameter list as URL parameters, generate a request URL by concatenating the URL parameters to a base URL included in the content item parameter, and transmit the request URL to the proxy server.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs (i.e., one or more modules of computer program instructions) encoded on one or more computer storage mediums for execution by, or to control the operation of, data processing apparatus. Alternatively or in addition, the program instructions can be encoded on an artificially-generated propagated signal (e.g., a machine-generated electrical, optical, or electromagnetic signal) that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client" or "server" include all kinds of apparatuses, devices, and machines for processing data, such as a programmable processor, computer, system on a chip, or multiple ones, or combinations of the foregoing. The apparatus can include special purpose logic circuitry, for example, a field programmable gate array (FPGA) or an application-specific integrated circuit (ASIC). The apparatus can also include, in addition to hardware, code that creates an execution environment for the computer program in question (e.g., code that constitutes processor firmware, protocol stack, database management system, operating system, cross-platform runtime environment, virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), organic light emitting diode (OLED), thin-film transistor (TFT), plasma, other flexible configuration, or any other monitor for displaying information to the user and a keyboard, a pointing device (e.g., a mouse, trackball, etc., or a touch screen, touch pad, etc.), by which the user can provide input to the computer. Other kinds of devices can be used to provide for interaction with a user as well; feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component (e.g., as a data server), a middleware component (e.g., an application server), or a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Communication networks may include a local area network (LAN) and a wide area network (WAN), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method to exchange data in a networked system, comprising:

storing, by a web browser executed by a client device, a client device profile comprising a plurality of client device parameters and processor-executable instructions to generate a content request in a restricted environment, within the client device, generated to restrict access, by the client device, to a particular content server;

detecting, within a web page being rendered at the client device, a content slot having executable instructions to create a content request to obtain content from the particular content server;

transmitting, by the web browser and in response to detecting the content slot, a content item parameter to the restricted environment within the client device prior to the client device requesting content from the particular content server;

generating, within the restricted environment and prior to the client device requesting content from the particular content server, a parameter list based on the client device profile and the content item parameter;

transmitting, by the restricted environment, the parameter list to a proxy server instead of the particular content server; and receiving, by the client device and in response to transmitting the parameter list to the proxy server, a content item from the particular content server to render in the content slot of the web page based on the proxy server determining an aggregate value of at least one parameter in the parameter list satisfies a predetermined threshold.

2. The method of claim 1, further comprising generating, by the web browser, a plurality of restricted environments, each of the plurality of restricted environments comprising a respective client device profile and a respective set of processor-executable instructions to generate the content request, wherein each of the plurality of restricted environments are associated with a different content server.

3. The method of claim 1, further comprising:

identifying, by the web browser, a content server associated with the content slot of the web page; and selecting, by the web browser, the restricted environment from a plurality of restricted environments based on an identification of the content server associated with the content slot of the web page.

4. The method of claim 1, wherein the content item parameter comprises at least one of an identifier of the content slot, a request identifier, a base resource uniform resource locator (URL), or a URL of the web page.

5. The method of claim 1, further comprising:

receiving, by the web browser, a second web page comprising a second set of processor-executable instructions to generate the content request, wherein the second set of processor-executable instructions are provided by the content server; and updating, by the web browser, the processor-executable instructions stored in the restricted environment based on the second set of processor-executable instructions.

6. The method of claim 1, further comprising:

transmitting, by the web browser, a second content item parameter to the restricted environment based on the web browser receiving a second web page;

generating, by the web browser executing the processor-executable instructions stored in the restricted environment, a second parameter list based on the client device profile and the second content item parameter;

transmitting, by the web browser, the second parameter list to the proxy server; and receiving, by the web browser, a generic content item to render in a content slot of the second web page based on the proxy server determining a second aggregate value of at least one parameter in the second parameter list does not satisfy the predetermined threshold.

7. The method of claim 1, further comprising selecting a portion of client device parameters to include in the parameter list to satisfy the predetermined threshold.

8. The method of claim 1, wherein the content item is selected based on at least one of the parameters in the parameter list.

9. The method of claim 1, wherein parameters of the parameter list are configured based upon a frequency of occurrence of the parameters.

10. The method of claim 1, wherein receiving the content item comprises receiving the content item from the proxy server responsive to the proxy server receiving the content item from the content server.

11. The method of claim 1, wherein transmitting the parameter list to the proxy server further comprises:

encoding the parameter list as URL parameters;

generating a request URL by concatenating the URL parameters to a base URL included in the content item parameter; and transmitting the request URL to the proxy server.

12. A system to exchange data in a networked system, comprising:

one or more computing devices; and one or more storage devices coupled with the one or more computing devices and storing instructions that, when executed by the one or more computing devices, cause the one or more computing devices to perform operations comprising:

storing, in a restricted environment, a client device profile comprising a plurality of client device parameters and processor-executable instructions to generate a content request in a restricted environment, within a client device, generated to restrict access, by the client device, to a particular content server;

detecting, within a web page being rendered at the client device, a content slot having executable instructions to create a content request to obtain content from the particular content server;

transmitting, by a web browser and in response to detecting the content slot, a content item parameter to the restricted environment within the client device prior to the client device requesting content from the particular content server;

generating, within the restricted environment and prior to the client device requesting content from the particular content server, a parameter list based on the client device profile and the content item parameter;

transmitting the parameter list from the restricted environment to a proxy server instead of the particular content server; and receiving, in response to transmitting the parameter list to the proxy server, a content item from the particular content server to render in the content slot of the web page based on the proxy server determining an aggregate value of at least one parameter in the parameter list satisfies a predetermined threshold.

13. The system of claim 12, wherein the instructions cause the one or more computing devices to perform operations further comprising generating a plurality of restricted environments, each of the plurality of restricted environments comprising a respective client device profile and a respective set of processor-executable instructions to generate the content request, wherein each of the plurality of restricted environments are associated with a different content server.

14. The system of claim 12, wherein the instructions cause the one or more computing devices to perform operations further comprising:

identifying a content server associated with the content slot of the web page;

and selecting the restricted environment from a plurality of restricted environments based on an identification of the content server associated with the content slot of the web page.

15. The system of claim 12 wherein the content item parameter comprises at least one of an identifier of the content slot, a request identifier, a base resource URL, or a URL of the web page.

16. The system of claim 12, wherein the instructions cause the one or more computing devices to perform operations further comprising:

receiving a second web page comprising a second set of processor-executable instructions to generate the content request, wherein the second set of processor-executable instructions are provided by the content server; and updating the processor-executable instructions stored in the restricted environment based on the second set of processor-executable instructions.

17. The system of claim 12, wherein the instructions cause the one or more computing devices to perform operations further comprising:

transmitting a second content item parameter to the restricted environment based on the web browser receiving a second web page;

generating, by executing the processor-executable instructions stored in the restricted environment, a second parameter list based on the client device profile and the second content item parameter;

transmitting the second parameter list to the proxy server; and receiving a generic content item to render in a content slot of the second web page based on the proxy server determining a second aggregate value of at least one parameter in the second parameter list does not satisfy the predetermined threshold.

18. The system of claim 12, wherein the instructions cause the one or more computing devices to perform operations further comprising selecting a portion of client device parameters to include in the parameter list to satisfy the predetermined threshold.

19. The system of claim 12, wherein the content item is selected based on at least one of the parameters in the parameter list.

20. The system of claim 12, wherein parameters of the parameter list are configured based upon a frequency of occurrence of the parameters.

21. The system of claim 12, wherein the instructions cause the one or more computing devices to perform operations further comprising receiving the content item from the proxy server responsive to the proxy server receiving the content item from the content server.

22. The system of claim 12, wherein the instructions cause the one or more computing device to perform operations further comprising encoding the parameter list as URL parameters;

generating a request URL by concatenating the URL parameters to a base URL included in the content item parameter; and transmitting the request URL to the proxy server.

\* \* \* \* \*